United States Patent Office 3,304,227
Patented Feb. 14, 1967

3,304,227
ANTIBIOTIC-CONTAINING ANIMAL FEED
Loyal E. Loveless, 248 Rosemont, St. Louis, Mo. 63119
No Drawing. Continuation of application Ser. No. 218,553, Aug. 22, 1962. This application July 15, 1965, Ser. No. 472,361
4 Claims. (Cl. 167—53.1)

The present application is a continuation of copending application Serial No. 218,553, filed August 22, 1962, now abandoned.

This invention relates to tetracyclic antibiotics and to procedures for using them effectively. More specifically, the invention is directed to the use of tetracycline antibiotics in the control of bacteria and other pathogenic organisms in the bodies of higher animals, particularly birds and mammals. More specifically, the invention relates to animal feeds containing tetracycline antibiotics in an effective formulation.

When a living organism ingests a tetracycline antibiotic, especially tetracycline, 5-oxytetracycline or 7-chlorotetracycline, it enters the body fluids and becomes active in the control of parasitic bacteria and other pathogens present in the said fluid. Often the control of these organisms depends upon a substantial concentration of the antibiotic in the body fluid, especially in the blood. In some instances, the effective concentration can be attained by increasing the quantity charged to the feed, but this procedure is often not desirable because of the cost of the tetracycline antibiotic and because of the inefficient utilization of the additional amount. By analytical procedures the concentration in the blood can be determined and this is a measure of the degree of protection which the host animal is receiving from the antibiotic. If the animal is seriously infected the use of the antibiotics may be manifested by a growth response or an improvement in feed efficiency.

The availability of the tetracycline antibiotics and the concentration in the blood may under certain conditions be influenced by other food components. Soluble calcium compounds inhibit the assimilation of the antibiotics and it is desirable to keep them at a minimum by either reducing the calcium content or by substituting very insoluble compounds, such as calcium sulfate, for the more soluble calcium carbonate and limestone usually used.

The inhibiting effect of calcium can also be minimized by the addition of sodium salts whereby the objectionable calcium is replaced by sodium and potassium. Thus, sodium phosphate ($N_3PO_4$), dibasic sodium phosphate ($Na_2HPO_4$), and dihydric phosphate ($NaH_2PO_4$) may be added.

The phrase "tetracycline antibiotics" as used in this specification and the appended claims is intended to have a generic significance and includes a variety of compounds which have antimicrobial activity and have similar structures to which have been assigned the generic name "tetracycline" by the Chemical Abstracts Nomenclature (S.A.C.S. 74, 4976). Many of the tetracycline antibiotics are produced by culturing certain fungi and separating the bacterial active compounds produced by the fungi. Other "tetracycline antibiotics" are synthesized by the chemical modification of naturally produced tetracycline antibiotics.

The tetracycline antibiotics will have the basic structure:

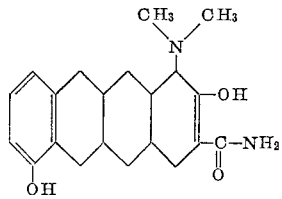

with substituents which may vary in position and kind.

The accepted nomenclature regards the tetracycline (achromycin) as being:

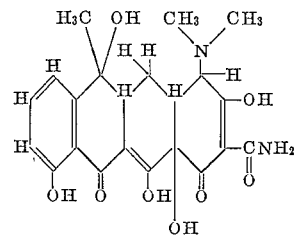

The substituted tetracyclines include:

| Substituent: | Amine name |
|---|---|
| 5-OH | (Terramycin) 5-oxytetracycline. |
| 7-Cl | (Aureomycin) 7-chlorotetracycline. |
| 7-Br | 7-bromotetracycline. |

Other homologues include:

6-deoxy-5-oxytetracycline
4-de(dimethylamino)-5-oxytetracycline
6-deoxytetracycline
6-deoxy-6-dimethyltetracycline
6-methyl-7-chlorotetracycline
4-de(dimethylamino)tetracycline
4-de(dimethylamino)-7-chlorotetracycline
6-demethyltetracycline Other tetracyclines of the basic structure are:

4-dimethylamino-1,4,4a,5,7,8,9,10-decanhydro-3,11,12a-trihydroxy-6-methyl-1,10-dioxo-2-naphthacenecarboxamide
carboxamido-N-(isopropyl)-6-deoxy-7-chlorotetracycline
6-demethyl-12a-deoxyanhydrotetracycline
5a-epitetracycline
6-methylene-5-oxytetracycline
6-demethyl-7-chlorotetracycline
7-bromo-6-dimethyl-6-deoxytetracycline
8 - 12a - dibromo-1,4,4a,5,12,12a-hexahydro-3,10,11-trihydroxy-6-methyl-1,12-dioxo-2-naphthacenecarboxamide Other compounds containing the basic configuration (1) and their water-soluble salts are also embraced by the term "tetracycline antibiotics." The use of all of these compounds in the control of parasitic bacteria and other pathogens, and especially in the body fluids is well known and not part of this invention. It is also known that the tetracycline antibiotics enter the bloodstream and that the concentration of the antibiotics in the blood is a measure of the ability of the animal to resist the deleterious effects of the bacteria. Furthermore, it is known that by increasing the quantity of the antibiotic introduced in the digestive tract, the concentration in the bloodstream can be increased.

It has been found that by the concurrent introduction of certain chemcials greatly increased antibiotic concentrations in the blood will occur. Although the phenomenon of antibiotic potentiation is known, the compounds used in this manner are not greatly effective and provide only minimal beneficial effects. The primary purpose is to provide compositions which when fed to animals will induce high levels of the tetracycline antibiotics in the bloodstream. A further purpose is to provide a procedure which will enable the animals to become more resistant to harmful bacteria and will provide for a more efficient use of the antibiotic.

It is known that terephthalic acid when ingested with the tetracycline antibiotics aids in the assimilation of the antibiotic, such that the concentration of the antibiotic in the blood is substantially increased. Much experimental work has been done and many observations have been made with respect to the desirable antibiotic potentiation effect of terephthalic acid. Compounds with equivalent antibiotic potentation activity will have unquestionable utility. In the experimental work described hereinafter the activity of potentiating compounds are in several instances described in the percentage of the activity of terephthalic acid.

In accordance with this invention it has been found that aromatic polycarboxylic acids including terephthalic acid are of exceptional activity as potentiating agents if they are used in the presence of surface active agents. The mechanism of the activation has not been definitely ascertained, but it is of great value in providing for a more economical utilization of tetracycline antibiotics.

*Example 1*

In the absence of surface active agents the following data were observed in feeding chicks in the one day exclusion test. Three to four week old chicks were raised in starting batteries on an antibiotic-free diet. On the test day the chicks were weighed individually and each given 75 mg. of 5-oxytetracycline per kg. of body weight and 400 mg. of the test compound per kg. of body weight. Three hours after the administration of the antibiotic, blood was withdrawn by heart puncture, centrifuged and the plasma assayed for the antibiotic concentration. The following data sets forth the percentage of terephthalic acid activity observed by the several aromatic polycarboxylic acids:

| | |
|---|---|
| Terephthalic acid (stem closed) | 100 |
| Phthalic acid | 175 |
| 1,2,3-tricarboxybenzene | 210 |
| 1,2,4-tricarboxybenzene | 140 |
| 1,3,5-tricarboxybenzene | 155 |
| 1,2,4,5-tetracarboxybenzene | 225 |

This experiment demonstrates the utility of the class of aromatic carboxylic acids in the same manner as the prior art compound terephthalic acid.

The surfactants which can be used in the practice of this invention may be any of a large number of compounds which have both hydrophobic and hydrophilic properties. A wide variation of molecular configurations and chemical properties are possible. These surface active compounds may have cationic or anionic properties or may be neither cationic nor anionic (nonionic). Some surface active agents may have both cationic and anionic functional configurations, which agents are known as ampholytic surfactants.

Several distinct types of anionic surfactants may be used, for example the straight chained naturally occurring fatty acids and their soaps. This type includes the fatty acids derived from animal and vegetable oils by the conventional saponification procedures, such as stearic acid, ricinoleic acid, margaric acid, lauric acid, myristic acid, palmitic acid, capric acid, caprylic acid, oleic acid, linoleic acid and linolenic acid, the alkali metal salts of these acids, particularly the soduim and postassium salts, the heavy metal soaps of these acids, such as the salts of metals such as lead, cobalt, manganese, Zn, nickel, aluminum, copper, iron and chromium, and the amino soaps, wherein the said acids are reacted with amines, for example as in diethylaminostearate, di-n-butylaminolaurate and anilinopalmitate.

Modified carboxylic acids of somewhat different properties may be made by substituting organic groups on the aliphatic chain, for example by oxidation, which can take place on an unsatrated linkage to form a hydroxyl or epoxy group. Formic acid may be added to a double bond. By halogenation of the alpha carbon atom, hydroxylated alkyl substituents can be introduced. Halogenation on the unsaturated bonds provides a means of introducing side chains or functional groups. Other groups can be added directly to the double bond, for example formaldehyde will react with oleic acid to form a six member oxygen heterocyclic substituent. A variety of other mixed carboxylic acids can be prepared by saponification of wool, wax or by separation from tall oil. Other acids can be prepared from paraffins by oxidation to carboxy, keto and hydroxyl groups accompanied by the formation of lower molecular weight compounds. These carboxylic acids may have intermediate groups such as ester, ether, sulfonyl. All of these modified carboxylic acids may be used as surface actvie agents or may be converted to salts of alkali or heavy metals, or to amino soaps.

Another group of anionic surfactants are the esters of sulfur acids, such as sodium lauryl sulfate, the various alkali metal alkylaryl sulfonates, for example sodium dodecylbenzene sulfonate, sodium-2-ethylhexylnaphthyl sulfonate and sodium octadecyl benzene sulfonate. These and other sulfuric acid esters can be prepared by first reducing the acids, for example by sodium or by hydrogenation followed by sulfonation. Oxo alcohols and other synthetic alcohols, such as keryl alcohols, made by chlorination of kerosene, reacting with sodium benzoate and saponifying the resulting product; or the alcohol made by reaction of formaldehyde with triisobutylene may also be sulfated. Olefins or olefin polymers (polypropylenes and isobutylene polymers) may be sulfated directly. Ester alcohols and amidoalcohols will by sulfonation procedures provide valuable surfactants. Many alkane sulfonates, for example octadecyl sulfonate, those prepared by oxidation of long chain alkyl mercaptans, those prepared by direct reaction of paraffin oils with $SO_3$ or chlorosulfonic acid are valuable anionic surfactants. Petroleum sulfonates, known as mahogany or green soaps, by-products from the petroleum refining industry, are useful.

Other types of anionic surfactants are the phosphorus compounds such as di(2-ethylhexyl)orthophosphate or the acid phosphate esters of coco-monoethanolamide; sulfinic acid made by reduction of sulfonyl chlorides, the sulfunamides, the hydrogenated aromatization or polymerization of tall oil rosin acids, the lignin sulfonate by-products from the sulfite paper industry and the lignin sulfonates modified by controlled alkaline hydrolysis. These anionic surfactants have a long chain oil soluble group and an ionizable acid or salt group to provide the anionic properties.

The useful surfactants for the practice of this invention also include many of the cationic types; for example, the fatty acid nitriles prepared by the reaction of ammonia and fatty acid under pressure at elevated temperatures, amines with or without intermediate esters, ether or amide linkages; the amino alcohols; allyl diamines; the alkyl anilines; the imidazolines made by condensing fatty acids with ethylene diamine; the quaternary nitrogen bases containing a long chain oil soluble group and an ionizable acid group, usually chloride or bromide, such as tetradecyl pyridinium chloride; N-alkyl morpholine, which may be quaternized, for example with butyl bromide; the reaction product of pyridine and 2-chloroethyl dimethyl dodecyl ammonium chloride; the reaction products of tertiary amines and chloromethyl stearamide, the thiouronium salts, such as the reaction product of chlorinated paraffin and urea; and the phosphonium salts, such as higher alkyl bis(dimethylamino)phosphonium halides.

Another and a very important type of surfactant, which can be used, is that having neither anionic or cationic properties. These are called nonionic surfactants and include esters, ethers, alcohols and phenols which do not have ionizable substituents. They must have an oil attractive long chain hydrocarbon group and a hydrophilic substituent which is nonionogenic. This type of surfactant includes polyhydroxy compounds such as the fatty acid esters of the polysaccharides, such as sucrose and dextrose; the fatty acid monoesters of glycols; esters of fatty acid monoglycerides and hydroxy acids, such as lactic or glycolic acids; and the glucose derivatives, for example the transesterification product of methyl glucoside and long chain fatty acid esters. The bulk of the nonionic surfactants are based on ethylene oxide or homologues thereof, wherein the hydrophilic properties are due to the presence of a plurality of ethoxy groups. Many of these are prepared by the condensation of a large excess of ethylene oxide on a nonionic hydrophobic phenol or alcohol, for example dodecylphenol, but they also can be prepared by reacting a long chain fatty acid with a large excess of ethylene oxide which reacts with the ionogenic carboxy groups to form hydroxy ethyl esters, for example ethoxy (ethoxy)$_n$ stearate, and the ethylene oxide (9 mol) condensate with tetrapropylene-benzene sulfonic acid. An increase in the number of mols of ethylene oxide increases the hydrophilic properties. The nonionic surfactants may have in the hydrocarbon structure non-hydrocarbon groups such as tertiary amino nitrogen, sulfide, sulfone and ester groups. The intermediates for condensation with ethylene oxide have terminal groups such as hydroxyl, aldehyde, carboxyl, mercapto, sulfonic acid, sulfonamide, guanylurea, amino and amido. These will provide the necessary surface active properties.

One additional type of surfactants are the ampholytic compounds, possessing both cationic and anionic groups, for example N-dodecyl-N-phenyl, amino carboxylic acids, or salts, dimethylaminoethyl benzene sulfonic acid quaternized with an alkyl halide and the carboxylic acids containing an imidazoline molecular grouping.

Frequently the surface active agents may be improved or otherwise modified by the incorporation of additives known as builders such as pyrophosphates, polyphosphates, sodium silicates, clays, particularly the expanding lattice type silica gels, sodium zincate, colloidal aluminum hydroxide, ammonium carbonate, dicyandiamide, and sodium ferrocyanide.

Other surfactants and methods for their preparation and use are described in detail in the textbook "Surface Active Agents and Detergents," Schwartz, Perry and Berch, Interscience Publishers Inc. (1958). The word "surfactants" is used to define the broad class, all of which appear to aid the absorption of the tetracycline antibiotics and transfer from the digestive system into the bloodstream.

The following surfactants were used in the antibiotic potentiation studies described hereinafter. In the following tables the surfactants are identified by the letter associated with each of the following described surfactants:

(A) dodecylbenzene sodium sulfonate (85% active)
(B) dodecylbenzene sodium sulfonate (70% active)
(C) dodecylbenzene sodium sulfonate (40% active)
(D) mixed acids derived from tallow condensed with ethylene oxide
(E) alcohols from tallow acids condensed with ethylene oxide
(F) long chain mixed mercaptans condensed with ethylene oxide
(G) dodecyl phenol condensed with 6 mols of ethylene oxide
(H) nonyl phenol condensed with ethylene oxide
(I) long chain alcohols condensed with ethylene oxide (85% active)
(J) n-mixed alkyl, 8–18 carbon atoms, trimethyl ammonium chloride
(K) 1,3-propane diamine particularly quaternized with halides derived from tallow oil and condensed with ethylene oxide

*Example 2*

In vivo potentiation studies were conducted with 3 to 4 week old chicks maintained on an antibiotic free diet for at least one week. The tests were conducted by weighing each bird individually and administering to each bird 75 mg. of 5-oxytetracycline and 400 mg. of one of the above surfactants per kilogram of body weight by intubation. As a control, birds were fed the same amount of 5-oxytetracycline with no surfactant. Samples of blood were taken three hours after treatment with antibiotic. The samples were centrifuged to obtain a clear plasma and the plasma assayed for content of 5-oxytetracycline. The following table sets forth the observed concentrations of the antibiotic as a percentage of that found in the birds fed the antibiotic without surfactants:

| | Percent of control birds on normal ration |
|---|---|
| (A) | 315 |
| (B) | 455 |
| (C) | 440 |
| (D) | 135 |
| (E) | 205 |
| (F) | 225 |
| (G) | 160 |
| (H) | 160 |
| (I) | 205 |
| (J) | 255 |
| (K) | 455 |

These experiments demonstrate that surface active agents provide a very substantial increase, from 160 to 455 percent, in the concentration of antibiotic in the bloodstream in animals.

*Example 3*

Two to four week old birds were divided into groups of 15 chicks, which were weighed as a group and fed with each of the following diets:

| Ingredient | Diet A | Diet B |
|---|---|---|
| Ground yellow corn | 60.2625 | 60.2625 |
| 50% soybean oil meal | 24.0 | 24.0 |
| Tallow | 2.5 | 2.5 |
| Fish meal | 5.0 | 5.0 |
| Dehydrated alfalfa meal (17%) | 1.0 | 1.0 |
| Corn gluten meal (43%) | 2.0 | 2.0 |
| Vitamins | 0.5 | 0.5 |
| Hydroxy analogue of methionine | 0.0375 | 0.0375 |
| Terramycin | 0.2 | 0.2 |
| Potentiator A | 0.375 | 0.50 |
| Cellulose filler | 0.375 | 0.250 |
| Mineral mixture | 3.75 | 3.75 |

After one week on the above diets 2 ml. of blood were taken from the heart of each bird and the blood samples for each group of birds combined, centrifuged and assayed for 5-oxytetracycline. The blood of the control birds fed the same diet without the potentiators was found to contain 7.05 micrograms per ml. of the antibiotic. The blood of birds fed feeds containing 0.375 percent of potentiator A (dodecylbenzene sodium sulfonate-85% active) was found to contain 150 percent of the antibiotic of the control. The blood of birds fed on feeds with 0.50 percent of Potentiator A was found to contain 215% of the control concentration of the antibiotic. The blood of birds fed 0.5 percent of the dodecylbenzene sodium sulfonate (85% active) and 0.5 percent of terephthalic acid was found to contain 285 percent of the concentration of the blood in the birds fed without potentiators.

*Example 4*

Using the procedure of Example 2 except that the birds were fed the 5-oxytetracycline with 400 mg. per kg. body weight of terephthalic acid and 400 mg./kg. of surface active agents identified above by chemical name and reference letter.

| Surfactant: | Percent control |
|---|---|
| (A) | 620 |
| (D) | 305 |
| (E) | 470 |

*Example 5*

The procedure of Example 4 was repeated except that 7-chlorotetracycline was used in place of 5-oxytetracycline. It was found that surfactant A in combination with terephthalic acid increased the concentration in the blood serum 135 percent.

This invention may be practiced by preparing animal feeds by incorporating tetracycline antibiotics, surfactants and aromatic polycarboxylic acids in a conventional mixture of feed components. The use of this combination of potentiators produces a greater potentiation effect than is attained from either component alone. The same beneficial effect can be obtained by adding the surfactant to feed compositions containing terephthalic acid and tetracyclic antibiotics or by adding both surfactants and aromatic polycarboxylic acids to conventional feeds which usually include tetracycline antibiotics.

In the preparation of feeds the tertacycline antibiotics may be present in the feed in the amount of 50 to 500 gms. per ton of feed, preferred usage being from 150 to 300 gms. per ton. The potentiators have a broader range of activity for example one to twenty-five pounds per ton of feed, being the same for both the aromatic polycarboxylic acids and for the surface active agents. The optimum ratio of the two potentiating agents will depend upon the relative activity and the cost of each. The quantity of the potentiating mixture is usually much greater than that of the tetracycline antibiotics and will be determined by experimentation to ascertain what will provide the most efficient utilization of the antibiotic. Most compositions will find the optimum proportion between 5 and 20 pounds per ton of feed for both the polycarboxylic aromatic acids and the surface active agents.

Although the invention is described with respect to specific modifications, it is not intended that the details thereof shall be limitations on the scope of the invention except to the extent incorporated in the following claims.

What is claimed is:

1. A method of augmenting animal blood concentration of antibiotics selected from the class consisting of 5-oxytetracycline and 7-chlorotetracycline which consists essentially in feeding birds about 75 mg. per kg. body weight of an antibiotic selected from the class consisting of 5-oxytetracycline and 7-chlorotetracycline in combination with about 400 mg. per kg. body weight of a benzene polycarboxylic acid of the class consisting of terepthalic acid, phthalic acid, 1,2,3-tricarboxybenzene, 1,2,4-tricarboxybenzene, 1,3,5-tricarboxybenzene, and 1,2,4,5-tetracarboxybenzene, and about 400 mg. per kg. body weight of surface active agents selected from the class consisting of dodecylbenzene sodium sulfonate, mixed acids derived from tallow condensed with ethylene oxide and mixed alcohols derived from tallow condensed with ethylene oxide.

2. A method of augmenting animal blood concentration of antibiotics selected from the class consisting of 5-oxytetracycline and 7-chlorotetracycline which consists essentially in feeding birds a composition containing from about 50 to about 500 grams per ton of feed of antibiotics of said class, about one to about 25 pounds per ton of feed of a benzene polycarboxylic acid selected from the class consisting of terephthalic acid, phthalic acid, 1,2,3-tricarboxybenzene, 1,2,4-tricarboxybenzene, 1,3,5-tricarboxybenzene and 1,2,4,5-tetracarboxybenzene, and from about one to about 25 pounds per ton of feed of a surface active agent of the class consisting of dodecylbenzene sodium sulfonate, mixed acids derived from tallow condensed with ethylene oxide, and mixed alcohols derived from tallow condensed with ethylene oxide.

3. An animal feed containing from about 50 to about 500 grams per ton of feed of an antibiotic selected from the class consisting of 5-oxytetracycline and 7-chlorotetracycline, about one to about 25 pounds per ton of feed of a benzene polycarboxylic acid selected from the class consisting of terephthalic acid, phthalic acid, 1,2,3-tricarboxybenzene, 1,2,4-tricarboxybenzene, 1,3,5-tricarboxybenzene and 1,2,4,5-tetracarboxybenzene, and from about one to about 25 pounds per ton of feed of a surface active agent of the class consisting of dodecylbenzene sodium sulfonate, mixed acids derived from tallow condensed with ethylene oxide, and mixed alcohols derived from tallow condensed with ethylene oxide.

4. A composition for augmenting blood levels in host animals of antibiotics selected from the group consisting of 5-oxytetracycline and 7-chlorotetracycline which comprises from about one to about 10 parts by weight of said antibiotic, from about 10 to about 250 parts by weight of a benzene polycarboxylic acid selected from the class consisting of terephthalic acid, phthalic acid, 1,2,3-tricarboxybenzene, 1,2,4-tricarboxybenzene, 1,3,5-tricarboxybenzene and 1,2,4,5-tetracarboxybenzene, and from about 10 to about 250 parts of a surface active agent of the class consisting of dodecylbenzene sodium sulfonate, mixed acids derived from tallow condensed with ethylene oxide, and mixed alcohols derived from tallow condensed with ethylene oxide.

References Cited by the Examiner

UNITED STATES PATENTS

| | | | |
|---|---|---|---|
| 2,734,482 | 2/1956 | Seltzer | 119—1 |
| 2,855,340 | 10/1958 | Kent | 167—53 |
| 2,890,980 | 6/1959 | Hotchkiss | 167—53 |
| 2,907,693 | 10/1959 | Price et al. | 167—65 |
| 2,994,639 | 8/1961 | Carper et al. | 167—65 |
| 3,011,943 | 12/1961 | Rogers | 167—53 |
| 3,074,846 | 1/1963 | Nichols | 167—53 |

LEWIS GOTTS, *Primary Examiner.*

SHEP K. ROSE, *Assistant Examiner.*